INVENTOR:
JOSEPH A. STANLEY, JR.

Jan. 11, 1972   J. A. STANLEY, JR   3,634,229
DEIONIZING WATER WITH ION EXCHANGE RESIN
AND REGENERATING THE RESIN
Filed July 3, 1968                    2 Sheets-Sheet 2

INVENTOR:
JOSEPH A. STANLEY, JR.
BY:

United States Patent Office 3,634,229
Patented Jan. 11, 1972

3,634,229
DEIONIZING WATER WITH ION EXCHANGE RESIN AND REGENERATING THE RESIN
Joseph A. Stanley, Jr., 405 Ave. U,
Lubbock, Tex. 79401
Filed July 3, 1968, Ser. No. 742,218
Int. Cl. B01d 15/04, 15/06, 15/02
U.S. Cl. 210—33                                    2 Claims

ABSTRACT OF THE DISCLOSURE

Ion exchange resin beads used in mixed-bed water purification are separated by backwashing them in a tower. After separation, one of the varieties of beads is removed to a separate tower. The acid, caustic, and brine solutions for regeneration are mixed in separate calibrated tanks and the mixed solution is pumped at a controlled rate over the resin beads for regeneration. The flow of the regenerant over the beads is further regulated by flowing the effluent through a liquid level control. The regenerated resin beads are then returned to the large tank where they are mixed. With this equipment, water may be deionized in the large tower or the regenerated resin can be transferred to separate small exchange tanks for "on location" use. Both the large and small regeneration towers are made from uncoated fiberglass, which is translucent, and each contains windows for the entire working height of the tower.

BACKGROUND OF THE INVENTION

(1) Field of the invention

This invention relates to water treatment and more particularly to regeneration of ion exchange resin beads used in the treatment of water.

(2) Description of the prior art

It is known that water can be purified by flowing it over a bed containing cation and anion exchange resin beads mixed together. "Monobed Deionization With Amberlite Ion Exchange Resins," Rohm and Haas Publication IE-26-56c, copyrighted 1956, revised and reprinted in 1967.

To regenerate the bed under present commercial practice, the beads of the different types are separated by backwashing, i.e., placing them in a separation tower and flowing water upward through them. The beads of the two different type resins have different specific gravities, and they separate into two distinct layers. The layer of cation exchange resin beads can be regenerated with an acid solution and the layer of anion exchange resin beads can be regenerated with a caustic solution. Under present commercial practice the acid solution and caustic solution are mixed on a flow basis, i.e., the water and the regenerant are brought together and mixed in proper proportions as they enter the tower. This requires many adjustments in the rate of flow in order to place the regenerant solutions onto the resins beds at the exact concentration and at the exact rate of flow. Operation under present conditions requires the attendance of a technician to constantly determine the concentrations of regenerants by determining the specific gravities of samples drawn from the regenerating solutions. Furthermore, sometimes the resin will become packed in the towers and the regenerating solution will "channel," i.e., forming rivulets or passages through the bed of resin beads and does not fully contact all the beads to thoroughly regenerate them.

After regenreation, the beads are mixed by violent agitation. They are transferred into the treating or exchange tanks where the water purification occurs.

The technology before my invention includes the composition and concentration of regenerant, flow rates, quantities, etc.

SUMMARY OF THE INVENTION

According to my invention, I use towers with clear windows of synthetic resin such as "Plexiglas," which extend the full height of the towers.

Through the windows, the actual operations and separations within the towers can be monitored and observed. Although the towers themselves are not transparent, they are made from glass reinforced resin and have sufficient translucency so that the light passes through them, thereby illuminating the resin beads for observation through the windows. Furthermore, during certain steps, such as backwashing, separating, transferring and mixing, it is possible to observe the resin beads through the translucent tower material itself or determine if any areas have caked or packed with some beads still lodged in the bottom portion of the tower.

In one mode of operation of this equipment, the deionization or purification treatment takes place in small exchange tanks which are placed on locations such as laboratories and industry who require high-purity water. In such an operation, the spent resin in the small exchange tank is brought back from field location and is transferred from the exchange tank into the large tower where the two resins are separated by conventional techniques into the two layers. Thereafter, the bottom layer of the cation exchange resin beads are transferred into a small tower. After the resin beads are separated into the separate towers, they are each regenerated.

The regenerant solutions are mixed to proper concentrations in calibrated tanks. Then the regenerant solutions are pumped from their tank at a constant rate over the resin beads. The effluent from the regenerating operation is brought to a constant level controller so as to automatically control the pressure at the bottom of the tower by maintaining a constant head within the tower. By this means and by visual observation and monitoring of the height of the regenerant solution over the resin bed together with the flow rate from the pump and with the proper concentration of the regenerant, very good regeneration is achieved.

After regeneration is achieved, the regenerant is flushed from the resin beads and the cation resin is transferred back to the large tower where the two beads are mixed with the conventional technology, thereafter to be transferred back to the small exchange tanks.

According to my invention, another type operation is available with this equipment, in which case after regeneration and mixing, the ion exchange resin beads remain in the large tower and the water treatment takes place in the large regeneration tower itself. Therefore, after the water has been treated, it is unnecssary to transfer the resin beads and it is only necessary to regenerate it as described above. Under this alternate usage, the large tower now becomes a large mixed bed demineralizer for the production of extremely high-purity water in the plant.

An object of this invention is to treat water.

Another object of this invention is to regenerate ion exchange resin beads used in a mixed-bed water purification system.

Further objects are to achieve the above with equipment that is sturdy, compact, durable, simple, safe, versatile, efficient and reliable, yet inexpensive and easy to manufacture, erect, operate, and maintain.

Still further objects are to achieve the above with a method that is safe, rapid, versatile, efficient and inexpensive and does not require skilled people to adjust, operate and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
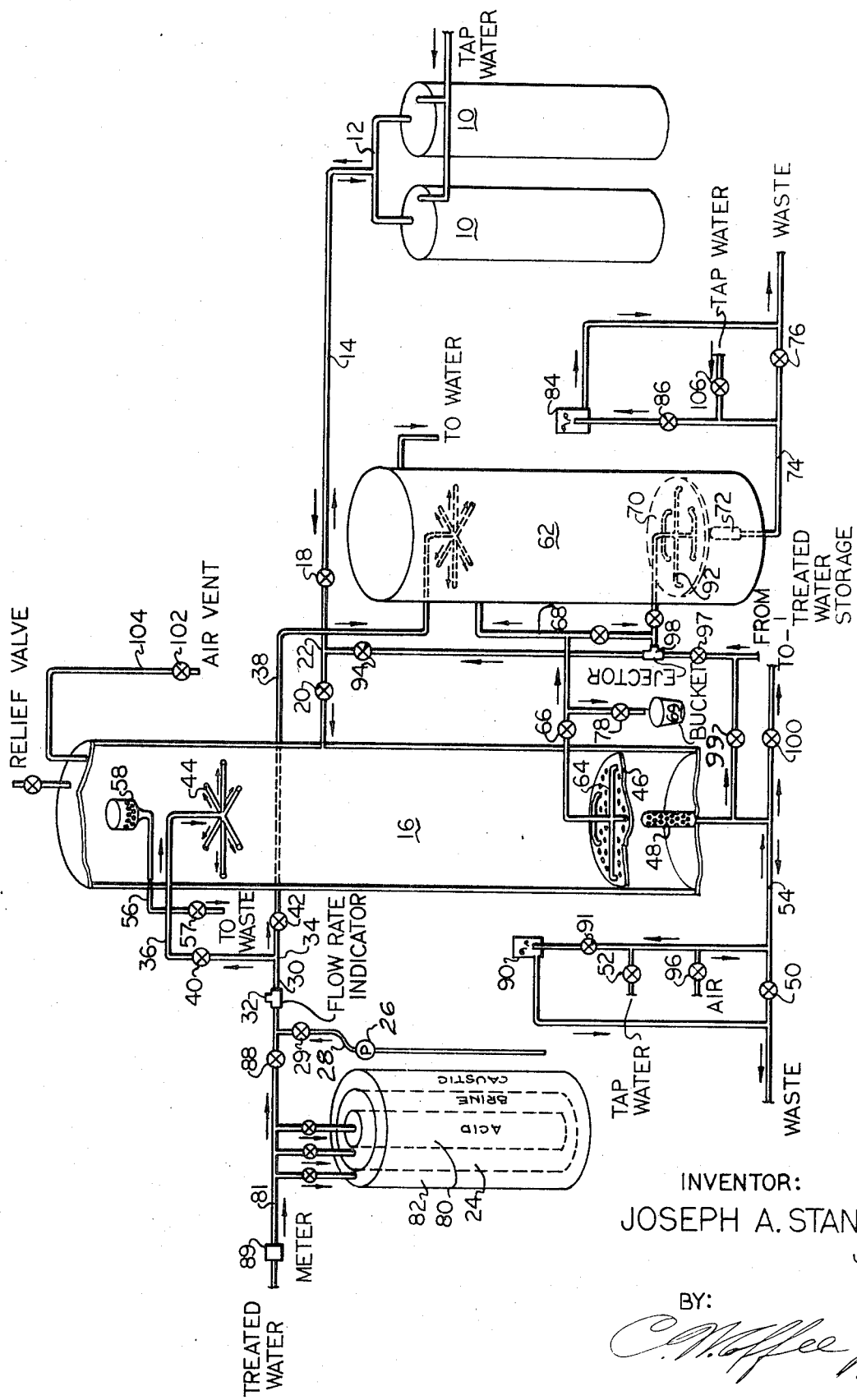
FIG. 1 is a schematic representation of the piping, tank arrangement and other equipment used in this invention.
Figure 2:
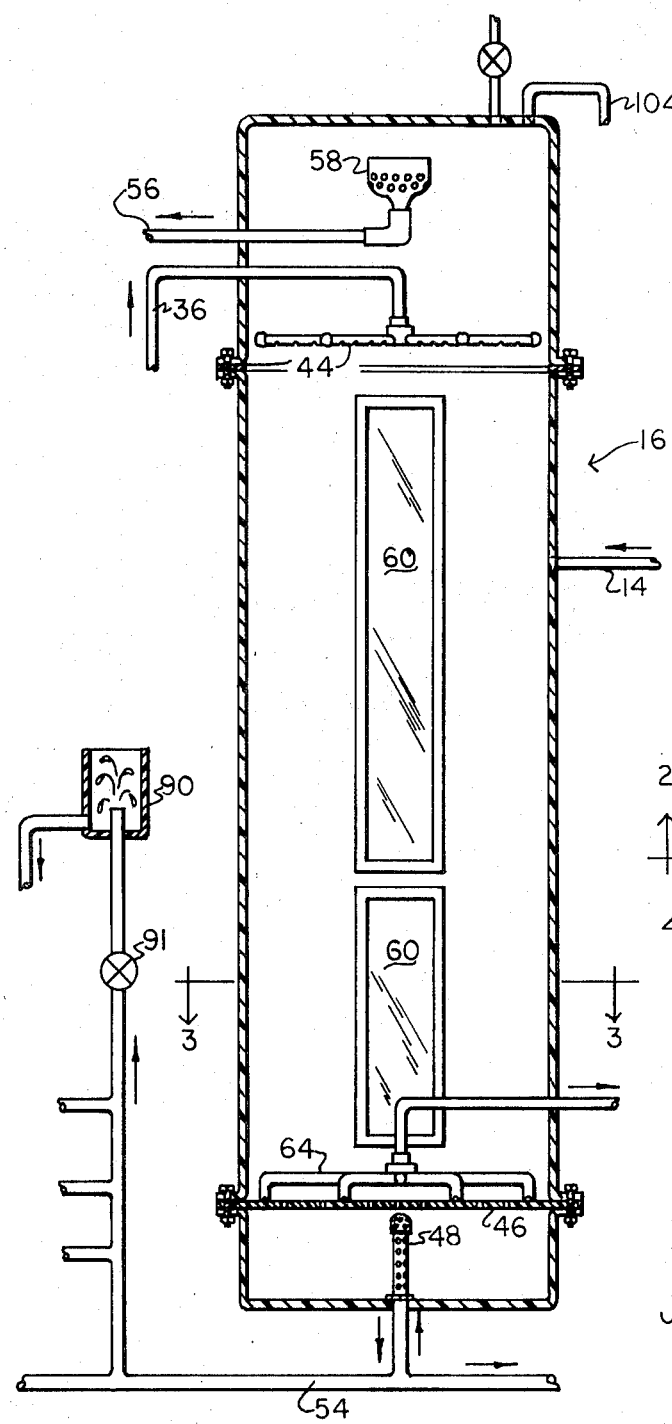
FIG. 2 is a longitudinal sectional view of one tower according to this invention, with some associated equipment, taken substantially on line 2—2 of FIG. 3.
Figure 3:
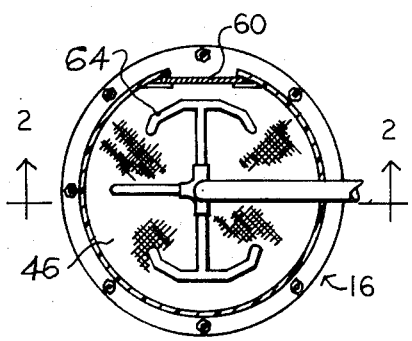
FIG. 3 is a cross sectional view taken substantially on line 3—3 of FIG. 2.

The regeneration as described in the first mode of operation takes place in exchange tanks 10.

In operation, the first step is to flush the mixed resin beads from the purification or exchange tanks 10 through header 12 and through line 14 into the large tower 16. The line 14 has valves 18 and 20 on either side of T 22 as illustrated. Also, the line connects into the large tower 16 intermediate of the top and bottom.

After the beads have been transferred into the large tower 16, they are washed with a brine solution from brine tank 24. The brine is transferred from the brine tank 24 by pump 26 which may be placed in different tanks and is connected by flexible hose 28 to regenerant line 30, which has a flow-rate indicator 32 therein.

Downstream from the flow rate indicator 32 is the T 34 to large tower ranch 36 and small tower branch 38. Valve 40 in the large tower branch 36 controls the flow to the tower 16 while valve 42 in the small tower branch 38 controls the flow in that direction.

The large tower branch 36 of the regenerant line 30 flows into the top of the large tower 16 and, therefore, when the brine is being pumped, flows over the bed of resin beads therein. The regenerant line terminates in the top of the large tower with a spider distributor 44 so that the flow of the brine or regeneratives will be distributed over the bed of resin beads within the large tower 16.

Bottom strainer 46 is spaced upward from the bottom of the large tower 16 to support the bed of resin beads. Bottom pipe 48 connects into the large tower 16 below the strainer 46. The bottom pipe 48 is connected to the waste through large tower drain valve 50.

The resin beads are separated by backwashing after they have been flushed with brine. To backwash the drain, valve 50 is closed and tap water is introduced into bottom line 54 by opening tap water valve 52. The valve 52 connects into the bottom line 54 which extends from the bottom pipe 48 to the valve 50. With the flow of the water through the bottom pipe 48, there will be a gentle agitation of the beads and because of the difference of density of the beads, they will separate into two separate distinct zones or layers.

The excess water from the backwashing will flow through large tower overflow pipe 56 to waste valve 57 therein being open. The overflow pipe 56 connects into the large tower 16 near the top, above the inlet spider distributor 44 which is just below top strainer 58. The separation operation in backwashing procedure is readily monitored through windows 60 in the large tower 16. The windows 60 are made of transparent or clear synthetic resin such as "Plexiglas." The tower 16 itself is made of a translucent resin which is reinforced by glass fibers. The tower 16 is illuminated by light through it. If there is a slug of beads caked or packed together in one of the bottom corners so that it is not being separated, this can also be seen through the translucent tower itself even though it might not be in front of one of the transparent windows 60.

When the two resins do separate into the two separate layers, it can be readily distinguished. After the resins are separated, the cation exchange resins will be in the bottom and the anion exchange resins will be in the top. The cation exchange resins beads are decanted or transferred to small tower 62 by resin pick-up 64 which is located in the large tower 16 just above bottom strainer 46. The beads flow through the resin valve 66 and on through small tower resin inlet line 68 which likewise enter into the small tower above center. Small tower 62 also has bottom strainer 70 which is near the bottom and just above bottom pipe 72 which connects to the bottom line 74 which has a drain valve 76 connected to the waste.

Both the large tower 16 and the small tower 62 are calibrated from the bottom strainer in cubic feet. Therefore, as soon as the separation has been made, it will be possible for the operator to read upon the calibrator how many cubic feet of cation resins he has in the small tower 62 and anion resins he has in the large tower 16. The small tower 62 has the same translucent wall and transparent window construction as the large tower 16. The transfer of the cation resins is accomplished because of the hydraulic head contained in the large tower, the top of the tall tower extends six or eight feet above the top of the small tower, the bottom strainers of each of the two towers being at about the same level. The transferring operation is observed and monitored through the transparent windows 60. At the time the interface between the cation resins and the anion resins is reached, the resin beads can be drawn off to bucket 69 through resin drain valve 78, which connects from the resin inlet line 68 to the open bucket.

After the volume of the cation exchange resin and anion exchange resin beads has been determined, the proper amount of acid regeneration solution can be prepared in acid tank 80 and the proper amount of caustic regeneration solution can be prepared in the caustic tank 82. The solutions are prepared by adding water to the water calibration and then concentrated regenerant to the regenerant calibration. As a typical example, if four cubic feet of cation exchange resins are to be regenerated, previously treated water from line 81 would be added to the acid tank 80 until the mark W–4 was reached. Thereafter acid would be added to this tank until mark A–4 was reached. Likewise, if there were five cubic feet of anion exchange resin to be regenerated, water from the line 81 would be added to the caustic tank 82 until the calibration W–5 was reached on the tank, thereafter caustic would be added until the calibration C–5 was reached at that tank. After slight agitation, the regenerant solutions of the correct concentration are prepared. The specific gravity of the regeneration solutions could be checked with a specific gravity hydrometer, however, in normal operation, the operator will only need to fill the tanks to the calibrations to obtain the proper concentration of the regenerant solutions.

After the solutions have been prepared, the acid regenerant solution is pumped by pump 26 from the acid tank 80 through the flexible hose 28 and the flow-rate indicator 32 to the regeneration line 30 and through the small tower valve 42. By control of either of the valve 42 or the flexible hose valve 29, the proper flow can be regulated.

To insure that the regenerant solution, at all times, forms a proper wash over the bed for regeneration, the pressure at the bottom of the small tower 62 is regulated by causing effluent to flow through small tank constant level controller 84. This is done by closing the small tower drain valve 76 and opening the small tower level controller valve 86. The level controller 84 is an overflow device whereby the effluent must maintain a certain pressure through the bottom line 74 before it over-flows the level. The overflow goes to waste by connecting back into the bottom line 74 on the downstream side of the drain valve 76.

The level controller 84 is at a level related to the top of the bed of resin in the tower 62. Good operation is obtained by having the level controller 84 slightly below the top of the bed, then the controlled flow of regenerant solution will form a liquid level slightly above the top of the bed. This level provides sufficient head to overcome the hydraulic friction loss of the solution flowing through the bed and still spill over the level controller 84.

After the acid regeneration, the excess acid is washed away by stopping the operation of the acid pump and closing the hose-line valve 29. Thereafter opening the regenerant line water valve 88. This will connect treated water into the regenerate line and, with the valve set as before, this regenerant water will flow over the treated acid regenerated cation exchange resin beads in the small tower 62. The wash water is metered by meter 89.

Thereafter, the anion exchange resin beads in the large tower 16 are regenerated by basically the same process. The small tank valve 42 is closed and the large tank valve 40 is opened so that when the pump 26 is inserted into the caustic tank 82 and the valve 29 is opened and the valve 88 is closed, the operation of the pump will flow caustic regenerant solution to flow through the large tower branch 36 and then wash over and regenerate the resin beads located in the large tower. As before, the discharge pressure from the large tower is regulated by large tower liquid level controller 90. This liquid level controller from the large tower 16 operates the same as the liquid level controller for the small tower 62 and insures that the caustic regenerant solution forms a proper flood over the beads. After the entire caustic solution from the caustic tank 82 has been pumped over them, the anion exchange resin beads are flushed with treated water in the same manner as the beads from the small tower 62.

After both resins have been regenerated and flushed with treated water, the cation exchange resin beads from the small tower 62 are transferred back into the large tower 16. This is done by ejecting them back from the resin pickup 92 which is located in the small tower just above the small tower bottom strainer 70. The small tower pickup 92 is connected through ejector valve 94 into the resin line 14. With the valve 18 closed and the valve 20 open, the resin is reintroduced into the large tower 16. After the two types of resins are again in the large tower 16, they are mixed by agitating them by blowing air into the bottom of the large tower through air valve 96 which is in the large tower bottom line 54.

After the regenerated resin beads are mixed, they have a final rinse with treated water and, thereafter, they are replaced into the purification tanks 10. The resin beads after being remixed and replaced into the purification tanks 10 by being drawn out by the large tank resin pickup 64 by ejector 98. In this situation, the ejector valve 94 will be open as will be valve 18 while valve 20 is closed. Treated water is supplied to the ejector through valve 97.

If monitoring through the windows 60 and the translucent walls of the tower 16 indicate that some of the resin is not flowing freely to the bottom, the bed may be agitated or "bumped" by treated water through valve 99, which connects the bottom pipe 48 to a source of treated water.

In the second mode of operation, discussed above, the operating steps are the same except that the remixed beads, after being regenerated, are left in the large tower 16 and the demineralization or purification of the water occurs there. In this instance, the water to be treated is introduced into the top of the large tower with the large tower drain valve 50 and the liquid level controller valve 91 both closed and the treated water valve 100 open, treated water can be diverted to a point of storage. The overflow valve 57 is closed and the air from the top of the tower is purged by vent valve 102 in air vent line 104. As seen, the acid tank 80, brine tank 24 and caustic tank 82 are nested, i.e., one inside of the other. It is necessary that each of these tanks be well sealed at the bottom or else the inner tanks would tend to float. I have found that nesting these three tanks together provide for a convenient means to operate so that the tanks occupy the least space possible. Cylindrical tanks are desirable because of their strength, however, placing three cylindrical tanks separate requires space and, therefore, it is desired to have them nested.

Instead of having the sides of the tanks 24, 80, and 82, calibrated, it is possible—and I prefer—to use a calibrated float. This float has a material which floats and has a plastic rod which extends through a small hole in each tank so that the float remains upright and the calibrated rod can be read readily. The tanks have openings in the top for the insertation of the pump 26.

Tap water may be introduced into the small tower bottom pipe 72 through tap water valve 106 in bottom line 74. This is desirable in certain operations where a cation resin in an exchange tank 10 is placed directly into small tower 62 and needs to be backwashed to remove trash therefrom.

Obviously all of the material used herewith is designed to maintain the purity of the water once it has been treated. For this reason, most of the lines and valves are constructed of polyvinyl chloride (PVC) and most of the tanks and towers of glass reinforced resins. The "Plexiglas" windows are welded into them by available technology.

The embodiment shown and described above is only exemplary. I do not claim to have invented all the parts or elements described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In the method of operation for deionizing water with different ion exchange resin beads in a mixed-bed, the improvement comprising the steps of:
   (a) making a mixed-bed of cation and anion exchange resin beads having different specific gravities in a large tower,
   (b) hydraulically separating the bed into separate layers of cation and anion exchange resin beads in said large tower,
   (c) removing one of the layers of beads to a small regeneration tower,
   (d) preparing regeneration solutions for said cation and anion exchange resin beads in separate tanks,
   (e) regenerating the beads remaining in the large tower by pumping one of the prepared regeneration solutions over the beads in that tower,
   (f) regenerating the beads in the small tower by pumping another of the prepared regeneration solutions over the beads in that tower,
   (g) regulating the pressure at the bottom of the towers during regeneration by discharging the effluent regeneration solutions therefrom through constant level controls which maintain the level of the regeneration solutions above the top of the beads in the towers thus controlling the flow rates of the regeneration solutions,
   (h) transferring the beads from the small tower back to the large tower,
   (i) mixing the beads in the large tower thus forming them into a mixed-bed,
   (j) using the large tower as a deonization chamber to deionize water therein, (k) supplying regenerated resin from said large tower to small exchange tanks, and (l) transporting the small exchange tanks to remote locations for treatment of water in the small exchange tanks.

2. The invention as defined in claim 1 with the additional limitation of (p) visually monitoring the entire operation through transparent windows in the tower and also through the translucent towers themselves.

References Cited
UNITED STATES PATENTS

| | | | |
|---|---|---|---|
| 2,646,171 | 7/1953 | Weiss | 210—33 X |
| 2,863,559 | 12/1958 | Schulze | 210—33 X |
| 3,394,079 | 7/1968 | Miller | 210—33 |
| 2,839,195 | 6/1958 | Reimers | 210—25 X |
| 2,935,194 | 5/1960 | Tomkin | 210—25 X |
| 3,193,498 | 7/1964 | Platzer | 210—33 |
| 3,429,807 | 2/1969 | Burgess | 210—33 X |

NORMAN YUDKOFF, Primary Examiner

S. J. EMERY, Assistant Examiner

U.S. Cl. X.R.

23—272, 311, 312 R; 210—95, 97, 189